US006250637B1

(12) United States Patent
Oricchio, Jr.

(10) Patent No.: US 6,250,637 B1
(45) Date of Patent: Jun. 26, 2001

(54) SEALING ASSEMBLY FOR A MOTOR VEHICLE

(75) Inventor: Lourenço Agnello Oricchio, Jr., Sao Paulo-SP (BR)

(73) Assignee: Sabo Industria e Comercio, Ltda., Sao Paulo (BR)

(*) Notice: Subject to any disclaimer, the term of this patent is extended or adjusted under 35 U.S.C. 154(b) by 0 days.

(21) Appl. No.: 08/951,257

(22) Filed: Oct. 16, 1997

(30) Foreign Application Priority Data

Oct. 16, 1996 (BR) .................................................. 9604203

(51) Int. Cl.$^7$ ...................................................... F16J 15/32

(52) U.S. Cl. .......................... 277/321; 277/317; 277/549

(58) Field of Search .................................... 277/321, 317, 277/562, 549, 565, 570, 571, 572, 573

(56) References Cited

U.S. PATENT DOCUMENTS

| | | | | |
|---|---|---|---|---|
| 4,055,993 | * | 11/1977 | Rackliffe et al. | 73/116 |
| 4,358,828 | * | 11/1982 | Reid et al. | 364/565 |
| 4,484,751 | * | 11/1984 | Deuring | 277/574 |
| 4,799,691 | * | 1/1989 | Stritzke et al. | 277/575 |
| 4,918,980 | * | 4/1990 | Deuring | 277/572 |
| 5,182,512 | * | 1/1993 | Braun et al. | 324/175 |
| 5,530,344 | * | 6/1996 | Caillaut et al. | 277/317 X |
| 5,611,545 | * | 3/1997 | Nicot | 277/317 X |
| 5,611,548 | * | 3/1997 | Dahlhaus | 277/317 X |

* cited by examiner

*Primary Examiner*—Anthony Knight
(74) *Attorney, Agent, or Firm*—Brown & Wood, LLP

(57) ABSTRACT

A sealing assembly for a crankshaft of a motor vehicle and including a sealing system having a radial sealing element, a track for the radial sealing element and supported on the crankshaft for rotation therewith, and a detector having a rotatable element formed integrally with the track and a stationary sensor cooperating with the rotatable element.

4 Claims, 7 Drawing Sheets

SEALING ASSEMBLY FOR A MOTOR VEHICLE

BACKGROUND OF THE INVENTION

1. Field of the Invention

The present patent relates to a sealing, pertaining to the field of auto parts and which was developed to provide better operating conditions for its purpose and to incorporate other functions normally not performed by this type of a vehicle component.

2. Description of the Prior Art

As it is known, the modern motor vehicles are equipped with electronic systems for supervising several parameters related to the functioning of several mechanisms thereof. Said systems substantially consist in: sensors installed in certain points of the mechanism related to the supervised parameters; and on-board computer, based on dedicated software, which receives and processes the information received from said sensors and as a function thereof, and sends command signals to the supervised mechanisms and/or to the signaling system and/or others.

Among the points supervised by these systems, there is the crankshaft, together with which there is mounted a sensor assembly, which detects the shaft rotation and transmits this information to the computer.

Considering said sensors assemblies, in the way they are constructed and mounted as well as for their purpose, it is desired to solve a problem inherent to them. Said sensors assemblies are normally installed inside the engine, in a hardly accessible location, generally inside the crankshaft bearing. Besides other problems, it makes the sensor mounting and maintenance more difficult.

SUMMARY OF THE INVENTION

In view of said problem and aiming to overcome it, an improvement in sealing, object of the present invention, was developed, essentially consisting in the association of the crankshaft end sealing system with the sensor which detects the shaft rotation information.

This mounting arrangement of the sensor solves the above mentioned problem, since said sensor is easily accessed, easing both its mounting and its eventual maintenance.

BRIEF DESCRIPTION OF THE DRAWINGS

The attached drawings show the sealing improvement, object of the present invention, in which.

DETAILED DESCRIPTION OF THE PREFERRED EMBODIMENTS

According to what is illustrated by the above mentioned figures, the sealing, object of the present invention, substantially comprises, as an assembly: a crankshaft end sealing system 1; and a device 2 consisting in a track for the radial sealing elements of the sealing system and the crankshaft rotation information detector, incorporated into each other.

Figure 1:
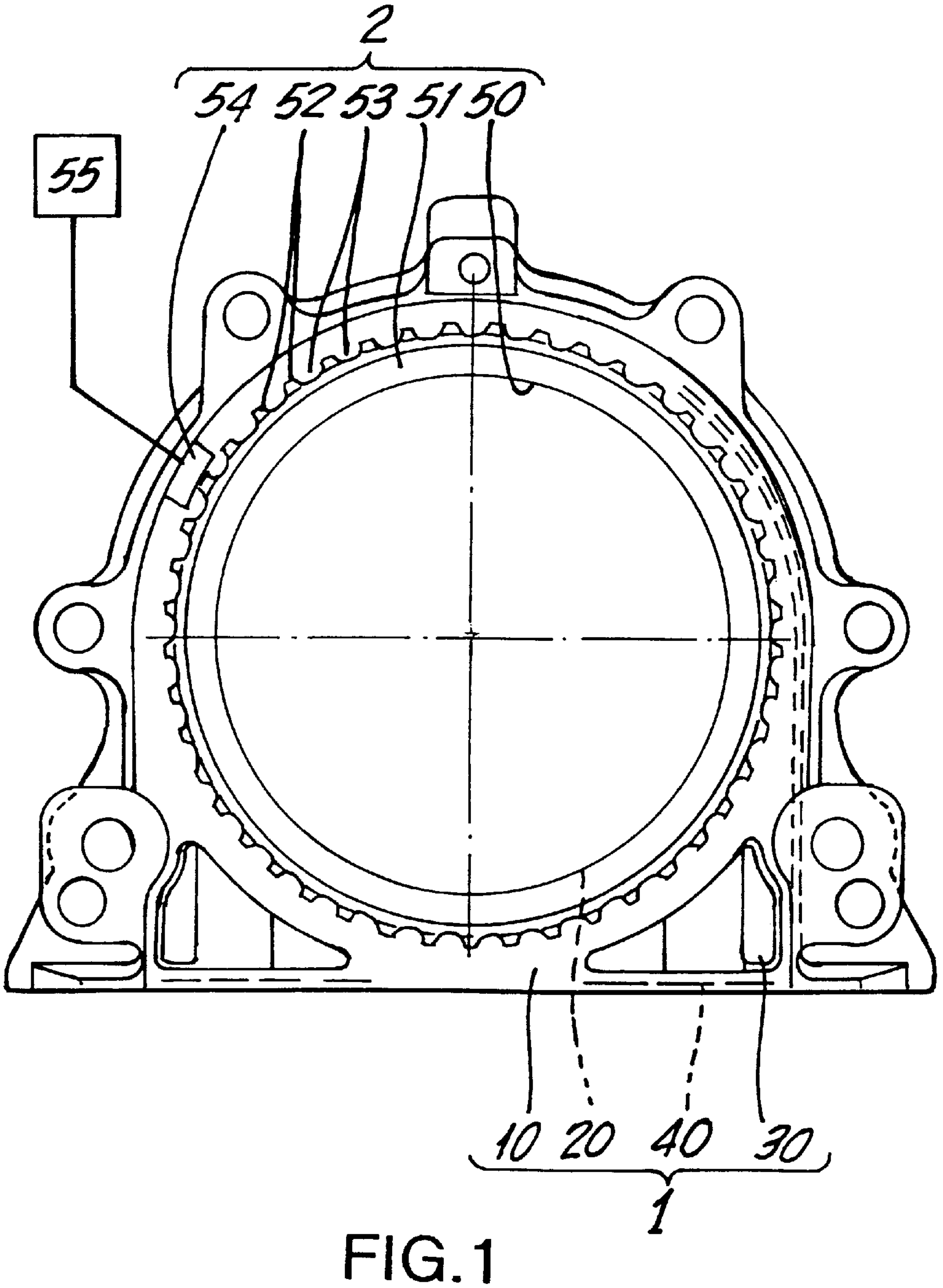
FIG. 1 shows the crankshaft end sealing in a preferred front version and seen from its side facing outwardly, opposite to the side adjacent to the engine block.
Figure 2:
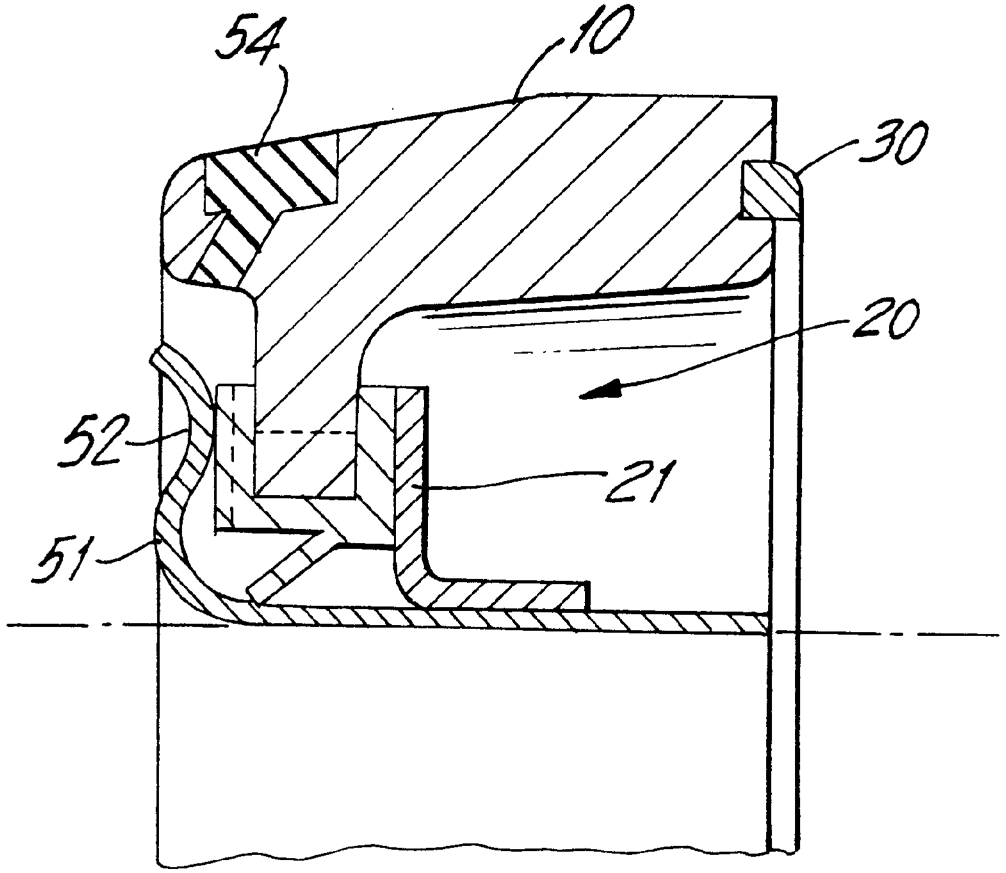
FIG. 2 shows a sectioned detail, in which the sensor assembly is seen.

In a preferred embodiment (FIGS. 1 and 2), the crankshaft end sealing system 1 is an integrated sealing system of the crankshaft ends, object of another patent application from the same applicant and substantially comprising: an annular structural element 10 for mounting on the engine block and which is around the crankshaft; and an assembly 20–30–40 of sealing elements that is able to provide all the required sealing at the crankshaft end, made of materials which are selected so as to obtain the sealings and that are able to be incorporated into the structural element by vulcanization, that is: radial sealing element 20 (FIG. 2) substantially comprising: a main sealing lip 21 in "L" section, made of polytetrafluorethylene—PTFE and provided with hydrodynamic sealing helical groove (not shown); and a sealing lip 24 made of rubber, felt and the like to prevent powder from entering; said sealing elements assembly further comprises: an elastomeric static sealing element 30 for superficial sealing between the structural element 10 and the engine block; and an elastomeric corner sealing element 40, for sealing the gap between the engine block and the crackcase joint.

Figure 3:
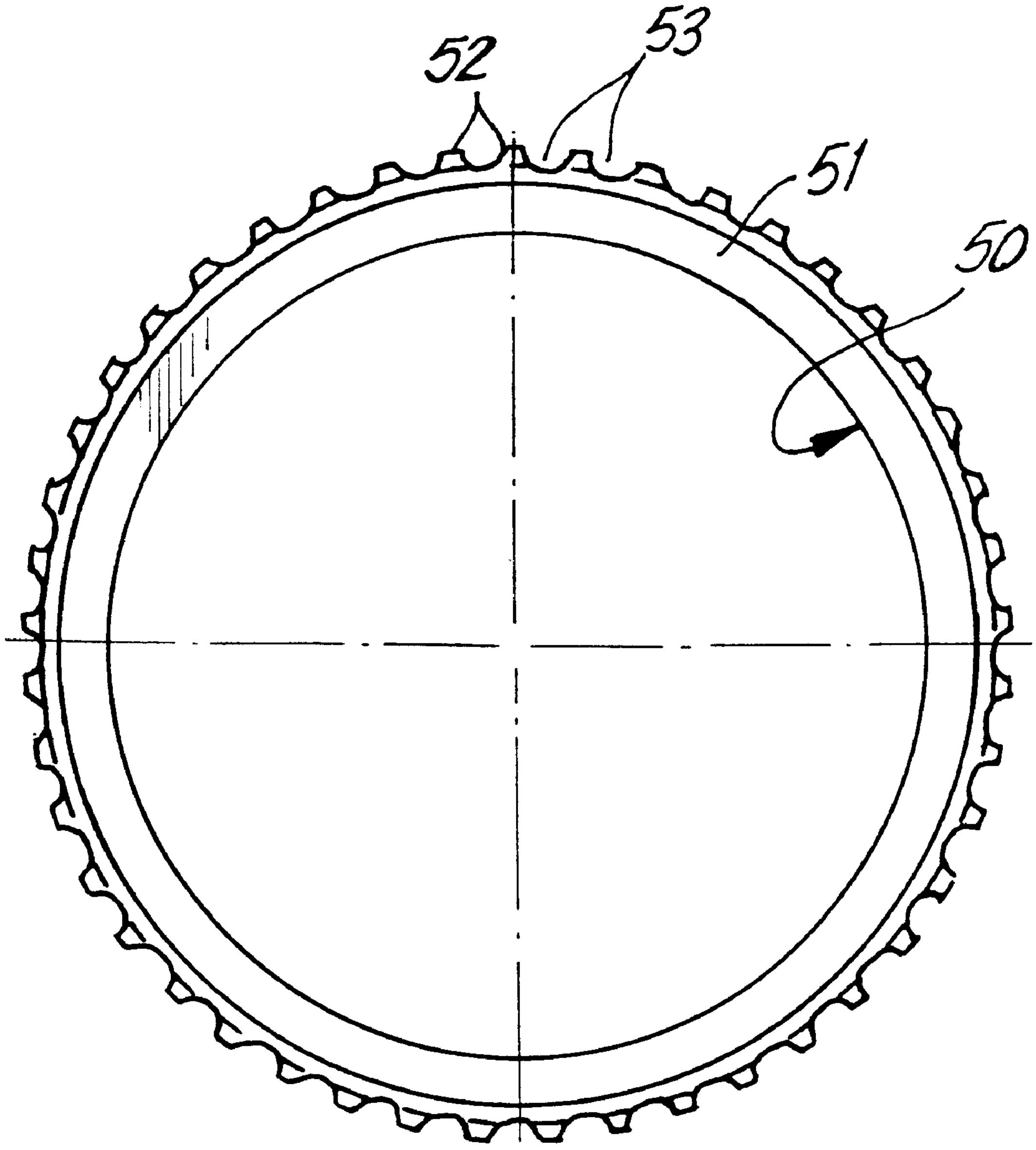
FIG. 3 shows a front view of a sleeve which is part of the sealing, taken alone.

The system, so constructed in its original version, besides the elements above mentioned in the construction according to the present invention, further comprises a device 2, having a track for the radial sealing elements/detector of the crankshaft rotation information, substantially consisting of: an annular sleeve 50 that can be mounted mutual to the crankshaft end sealing system 1 and whose outer surface forms a sealing track for the main sealing lips made of PTFE 21 and the sealing lip 24 to prevent powder from entering; and a detector device of the crankshaft rotation information comprising: a flange 51 extended from the outwardly facing end of sleeve 50 and provided with a knurled free edge formed by teeth 52 and gaps 53 among the teeth (FIG. 3); and a sensor 54 mounted on the structural element 10, that can be differently sensitized in the presence of a tooth 52 or a gap 53 of the flange edge 51, said sensor being connected and cooperating with a dedicated board computer 55.

Concerning the operation, particularly of the sealing elements 20, 30, 40 themselves, they work as usual in the present sealing. Concerning the detector device of the crankshaft rotation information, when the flange 51 rotates, its peripheral teeth 52 and gaps 53 pass by the sensor 54, that can be differently sensitized in the presence of one or another, generating different signals that are sent to the board computer 55, said computer processes them as known for counting the turns of the crankshaft.

Within the basic above mentioned construction, it is pleaded that the present sealing can suffer relative modifications in materials, dimensions, constructive details and applications, without departing from the patent protection scope.

Figure 4:
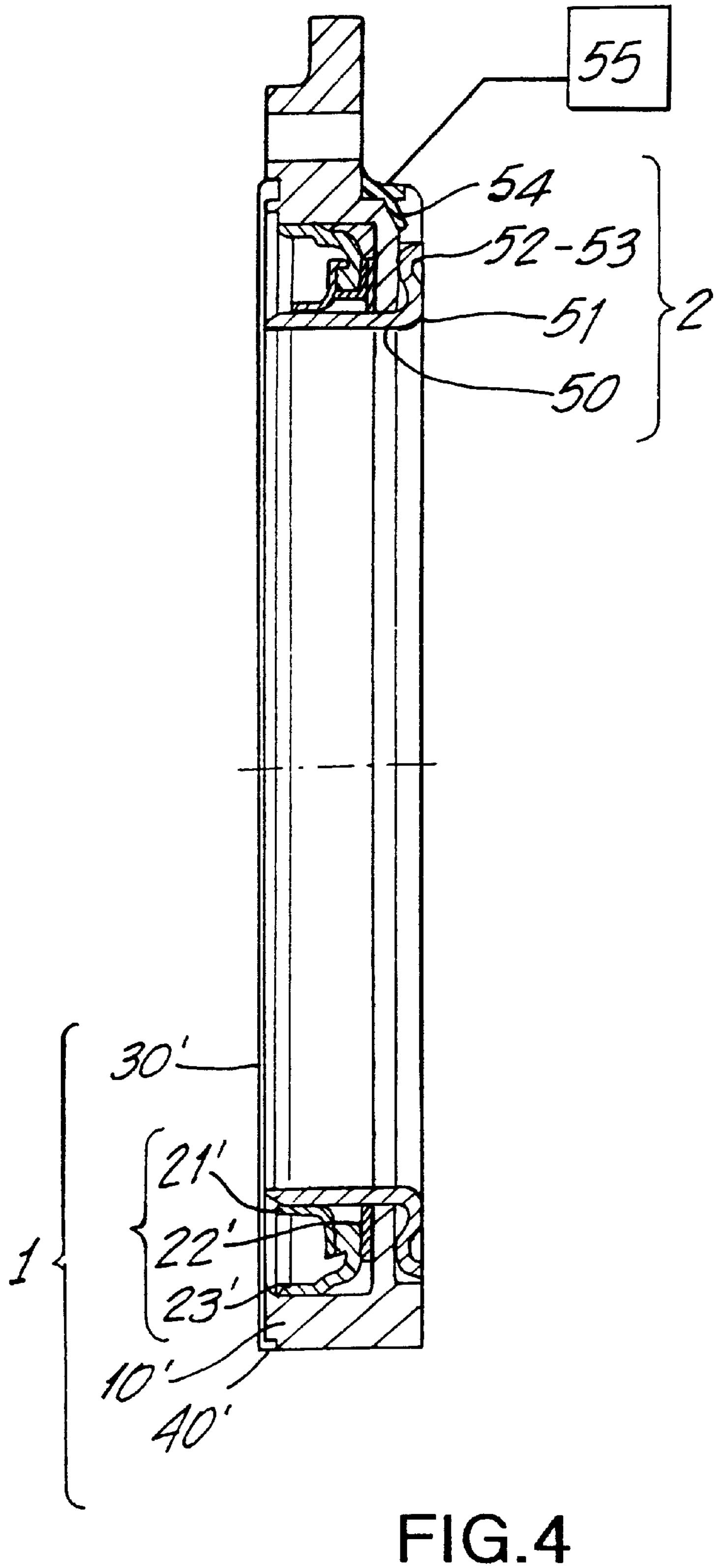
FIG. 4 shows a diametrical section of another possibility to perform the sealing.

Considering this, in another embodiment, the seal according to the present invention, may have the crankshaft end sealing system 1 consisting in a semi-integrated sealing system for the crankshaft (FIG. 4), object of another patent application from the same applicant, substantially comprising: a permanent structural element 10' for mounting on the engine block and that incorporates the superficial static sealing element 30' and the corner sealing element 40', being elastomeric and incorporated into the structural/mounting element 10' by vulcanization; said semi-integrated system further comprising a radial sealing element 20' essentially comprising: a main sealing lip made of polytetrafluoroethylene—PTFE 21' provided with hydrodynamic sealing; sealing lip 22' made of rubber, felt and the like to prevent powder from entering and body 23' incorporated into each other by vulcanization, thus forming an annular assembly originally insulated from the structural/mounting element 10' and which is mounted and attached therein at factory by interference.

The system, so constructed in its original version, besides the elements above mentioned in the construction according to the present invention, further comprises a device 2, having the track for the radial sealing elements/detector of the crankshaft rotation information, comprising: the annular sleeve 50 that can be mounted mutual to the crankshaft end and against which the main sealing lips 21' made of PTFE are sealed and the sealing lip 22' to prevent powder from entering; and the detector device of the crankshaft rotation information comprising: the flange 51 extended from sleeve 50 and provided with a knurled edge provided with teeth 52 and gaps 53 among the teeth; and the sensor 54 mounted on the structural element 10', that can be differently sensitized in the presence of the teeth 52 and gaps 53 of the flange 51, said sensor being connected to the dedicated board computer 55.

Figure 5:
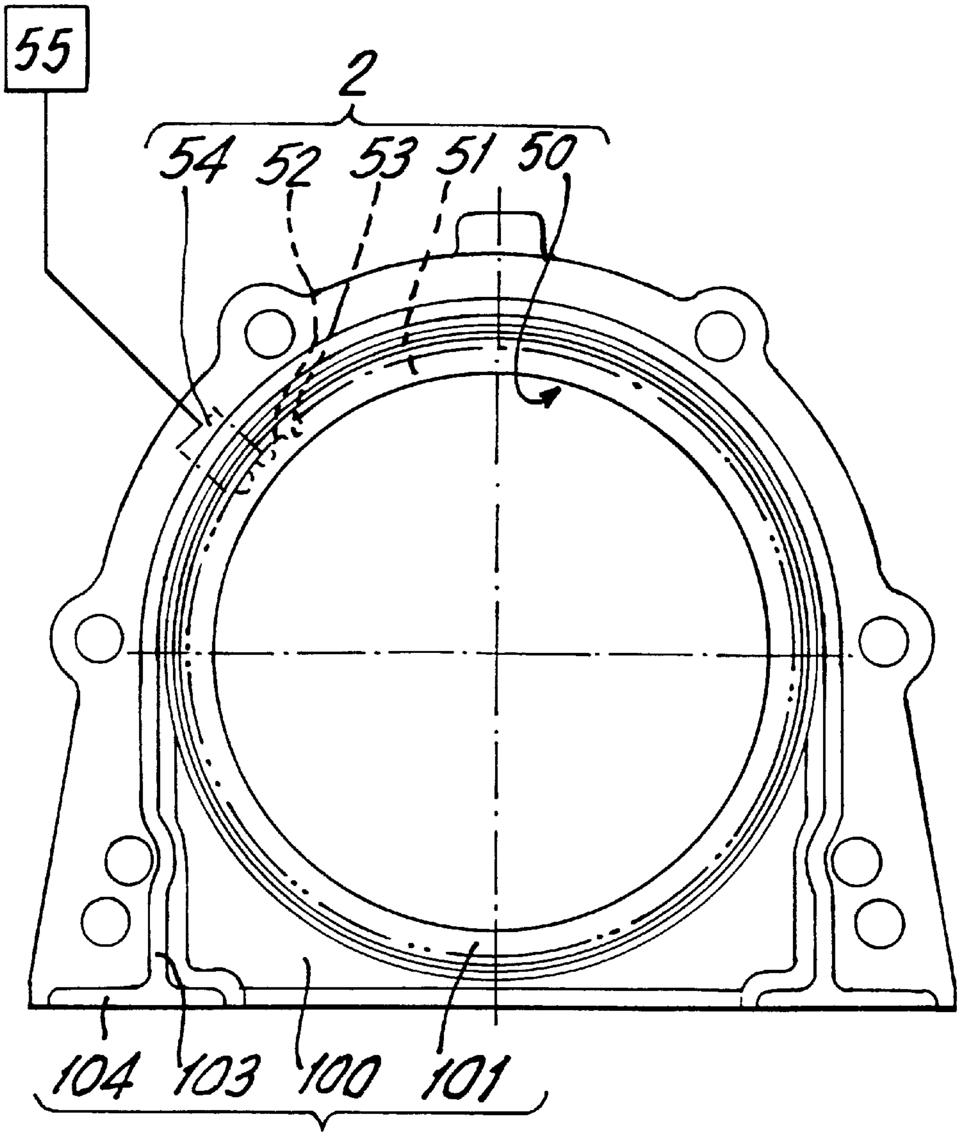
FIGS. 5, 6 and 7 show other embodiment possibilities of the sealing according to the present invention.
Figure 6:
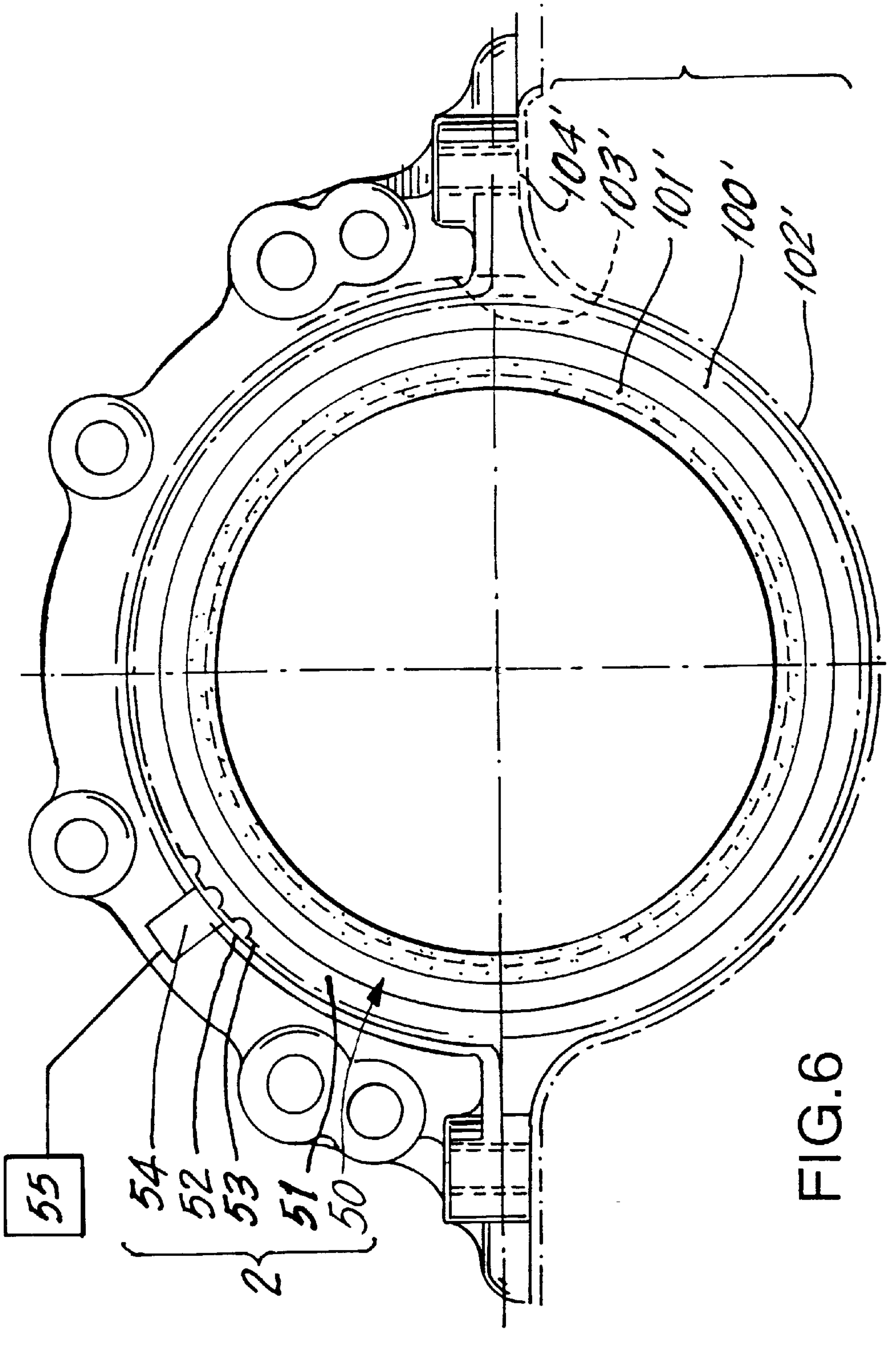

The sealing, according to the present invention, may have the crankshaft ends sealing system 1 comprising integrated sealing systems of the crankshaft ends of the type disclosed in other patent application from the same applicant, designed to long-skirt engines, (FIG. 5), or short-skirt (FIG. 6) and substantially comprising, respectively: an annular structural element 100, 100' for mounting on the engine block and an assembly of sealing elements made of elastomeric material being incorporated into the structural element 103, 103'; respectively which seals against the engine block, and a; corner sealing element 104, 104 ' which seals the gap between the engine block and the crankcase.

Figure 7:
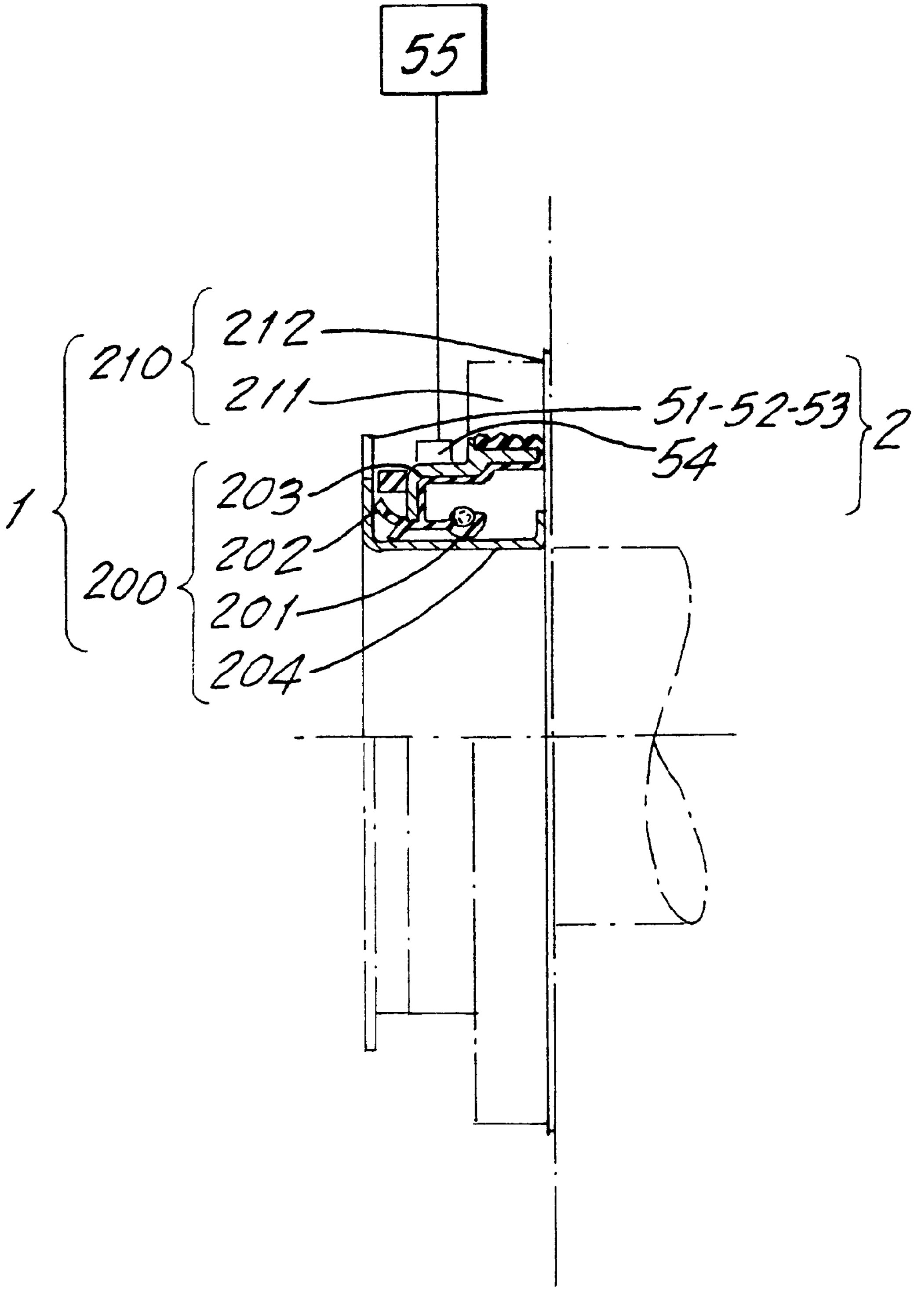

To the system having said construction, it is associated, in the present invention, the device 2, having the track for the radial sealing elements/detector of the crankshaft rotation information, comprising: the sleeve 50 mutual to the shaft and provided with the flange 51 with knurled edge provided with teeth 52 and gaps 53 and the sensor 54 mounted on the structural element 100, that can be differently sensitized by the teeth 52 and gaps 53 and working in conjunction with the dedicated board computer 55. The sealing, according to the present invention, may have the crankshaft ends sealing system 1 comprising (FIG. 7) conventional sealed retainers 200, of the type mounted on the engine with the aid of a mounting assembly 210, said conventional sealed retainers 200 being understood as those substantially comprising: the main sealing lip 201; auxiliary sealing lips 202; annular body 203 having the lips 201, 202 incorporated by vulcanization; and annular track 204 which is mounted mutual to the shaft and against which the main lip 201 seals, the mounting assembly 210 being understood as that substantially comprising: a flange 211 originally isolated from the retainer 200, the receptor thereof being mounted on the engine block; and a paperboard joint 212 for static sealing between the flange faces and the engine block.

In the sealing assembly formed by the conventional sealed retainer 200 and the mounting assembly 210 thus constructed, there is associated the detector device 2 of the crankshaft rotation information, comprising: the flange 51 incorporated into the retainer track end 204 facing outwardly and which has a knurled edge provided with sandwiched teeth 52 and gaps 53; and the sensor 54 which can be mounted for example on the retainer body 203 or on the mounting flange 211 or at any other place adjacent to the assembly and as to be sensitized by the teeth 52 and gaps 53 of the flange 51 knurled edge and which cooperates with the board computer 55.

Obviously, the sealing concepts, object of the present invention, may be applied in sealings which seal other assemblies other than the crankshaft end having a rotating element where the rotation information is to be detected and where a sealing system 1 works in conjunction with it. Thus, said sealing system 1 is associated to the device 2, having the track for the radial sealing elements/detector of rotation information from the rotating element, conveniently adapted to the installation features.

What is claimed is:

1. A sealing assembly for a crankshaft, comprising a sealing system for a crankshaft end and having a radial sealing element; track means for the radial sealing element; and detector means for detecting rotation of the crankshaft and including a rotatable element formed integrally with the track means, and a sensor cooperating with the rotatable element, wherein the sealing system comprises an annular structural element for mounting the sealing system on an engine block and around the crankshaft and further sealing elements formed, together with the radial sealing element, integrally with the annular structural element by vulcanization, the radial sealing element having a L-shaped main sealing lip formed of PTFE and a sealing lip formed of one of rubber and felt, and the further sealing elements including an elastomeric sealing element for providing surface sealing between the annular structural element and the engine block, and an elastomeric corner element for sealing a gap between the engine block and the sealing assembly;

wherein the track means is formed as an annular sleeve for mounting on the crankshaft end and having an outer surface forming track for the radial sealing element of the sealing system; and wherein the rotatable element is formed as an outwardly extending flange formed at an end of the annular sleeve remote from the engine block, the flange having a knurled free edge formed by alternating teeth and gaps, and the sensor is mounted on the annular structural element opposite the knurled free edge of the flange of the annular sleeve and is connectable with an on-board computer for communicating a respective signal thereto upon detecting one of a tooth and a gap.

2. A sealing assembly for a crankshaft, comprising a sealing system for a crankshaft end and having a radial sealing element; track means for the radial sealing element; and detector means for detecting rotation of the crankshaft and including a rotatable element formed integrally with the track and a sensor cooperating with the rotatable element, wherein the sealing system comprises an annular structural element for mounting the sealing system on an engine block and around the crankshaft, and a plurality of further sealing elements including an elastomeric sealing element for providing surface sealing between the annular structural element and the engine block, an elastomeric comer element, both being incorporated in the annular structural element by vulcanization, with the radial sealing element being substantially formed of a main sealing lip made of PTFE and provided with a hydrodynamic sealing and a further sealing lip formed of one of rubber and felt and connected with the main sealing lip by vulcanization, the radial sealing element forming a separate element that is secured to the annular structural element by interference;

wherein the track means is formed as an annular sleeve for mounting on the crankshaft end, and defining the track against which the main sealing lip and the further sealing lip engage;

wherein the rotatable element is formed as an outwardly extending flange formed at an end of the annular sleeve remote from the engine block, the flange having a knurled free edge formed by alternating teeth and gaps;

wherein the sensor is mounted on the annular structural element opposite the knurled free edge of the flange of the annular sleeve and is connectable with an on-board computer for communicating a respective signal thereto upon detecting one of a tooth and a gap.

3. A sealing assembly for a crankshaft, comprising a sealing system for a crankshaft end and having a sealing means; track means for the sealing means; and detector means for detecting rotation of the crankshaft and having a rotatable element formed integrally with the track means, and a sensor cooperating with the rotatable element;

wherein the sealing system comprises an annular structural element for mounting the sealing system on an engine block and on a crank case, and the sealing means includes a plurality of elastomeric sealing elements formed integrally with the annular structural element by vulcanization and including an inner radial sealing element for sealing against the crankshaft, an outer radial sealing element for sealing against the crankcase, a static sealing element for sealing against the engine block, and a corner sealing element for sealing the gap between the engine block and the crankcase; and wherein the track means comprises an annular sleeve for mounting on the crankshaft end and forming the track for the inner and outer radial sealing elements, wherein the rotatable element is formed as an outwardly extending flange formed at an end of the annular sleeve remote from the engine block, the flange having a knurled free edge formed by alternating teeth and gaps, and wherein the sensor is mounted on the annular structural element opposite the knurled free edge of the flange of the annular sleeve and is connectable with an on-board computer for communicating a respective signal thereto upon detecting one of a tooth and a gap.

4. A sealing assembly for a crankshaft, comprising a sealing system for a crankshaft end and having sealing means; track means for the sealing means; and detector means for detecting rotation of the crankshaft and including a rotatable element formed integrally with the track means, and a sensor cooperating with the rotatable element, wherein the sealing system comprises a sealed retainer having an annular body, the sealing means comprises a main sealing lip and an auxiliary sealing lip means both provided on the annular body by vulcanization, and an assembly for mounting the sealed retainer on an engine block and having a flange for mounting the sealed retainer on the engine block and a paperboard joint to be arranged between the mounting flange and the engine block for insuring sealing therebetween; and wherein the track means is supported on the crankshaft and defines a track sealingly engageable by the main sealing lip, wherein the rotatable element is formed as a flange provided at the end of the track and having a free edge formed by alternating teeth and gaps, and the sensor is mounted on one of the annular body and the flange opposite the knurled free edge of the flange and is connectable with an on-board computer for communicating a respective signal thereto upon detecting one of a tooth and a gap.

* * * * *